(12) United States Patent
Yang et al.

(10) Patent No.: US 9,900,695 B2
(45) Date of Patent: Feb. 20, 2018

(54) HEAD-MOUNTED ELECTRONIC DEVICE

(71) Applicant: SHENZHEN ROYOLE TECHNOLOGIES CO. LTD., Shenzhen (CN)

(72) Inventors: Songling Yang, Shenzhen (CN); Songya Chen, Shenzhen (CN); Chao Jiang, Shenzhen (CN)

(73) Assignee: SHENZHEN ROYOLE TECHNOLOGIES CO. LTD., Shenzhen, Guangdong (CN)

( * ) Notice: Subject to any disclaimer, the term of this patent is extended or adjusted under 35 U.S.C. 154(b) by 0 days.

(21) Appl. No.: 15/059,104

(22) Filed: Mar. 2, 2016

(65) Prior Publication Data
US 2017/0055079 A1   Feb. 23, 2017

Related U.S. Application Data

(63) Continuation of application No. PCT/CN2015/087568, filed on Aug. 19, 2015.

(51) Int. Cl.
*H04R 25/00* (2006.01)
*H04R 5/033* (2006.01)
(Continued)

(52) U.S. Cl.
CPC ....... *H04R 5/0335* (2013.01); *G02B 27/0176* (2013.01); *H04R 1/028* (2013.01); *G02B 2027/0181* (2013.01); *H04R 2201/025* (2013.01)

(58) Field of Classification Search
CPC .. H04R 5/0335; H04R 1/028; G02B 27/0176; G02B 2027/0181; H40R 2201/025
(Continued)

(56) References Cited

U.S. PATENT DOCUMENTS 5,003,300 A * 3/1991 Wells ............... G02B 13/16
340/980
5,321,416 A   6/1994 Bassett et al.
(Continued)

FOREIGN PATENT DOCUMENTS

CN  2525546 Y  12/2002
CN  2819243 Y   9/2006
(Continued)

OTHER PUBLICATIONS

Chen, Office Action, U.S. Appl. No. 15/059,111, dated May 18, 2017, 10 pgs.
(Continued)

*Primary Examiner* — Sean H Nguyen
(74) *Attorney, Agent, or Firm* — Morgan, Lewis & Bockius LLP

(57) ABSTRACT

The present application refers to a head-mounted electronic device including a headphone, a display portion, and two position limiting structures. The headphone includes a C-shaped elastic belt which has two connection ends, two movable members, each rotatably connected to one connection end around a first axis, and two sound generators, each rotatably connected to one movable member around a second axis. The display portion includes a main body generating and projecting images, and two connection members connected to opposite ends of the main body. Each of the two connection members is rotatably connected to the sound generators around a respective third axis. When rotating around the third axis, the headphone is driven by the display portion to rotate around the first axis and the second axis, which avoids distortion of the elastic belt and the connection member, and ensures the display portion can be folded together with the headphone.

17 Claims, 7 Drawing Sheets

(51) Int. Cl.
*H04R 1/02* (2006.01)
*G02B 27/01* (2006.01)

(58) Field of Classification Search
USPC .......................................................... 381/378
See application file for complete search history.

(56) References Cited

U.S. PATENT DOCUMENTS

| | | | |
|---|---|---|---|
| 6,369,952 | B1 | 4/2002 | Rallison et al. |
| 6,421,031 | B1* | 7/2002 | Ronzani ............... G02B 27/017 345/8 |
| 6,424,321 | B1 | 7/2002 | Ronzani et al. |
| 8,577,427 | B2 | 11/2013 | Serota |
| 2002/0005819 | A1 | 1/2002 | Ronzani et al. |
| 2002/0094094 | A1 | 7/2002 | Shin |
| 2002/0163486 | A1 | 11/2002 | Ronzani et al. |
| 2004/0201695 | A1 | 10/2004 | Inasaka |
| 2006/0062417 | A1 | 3/2006 | Tachikawa |
| 2007/0256107 | A1 | 11/2007 | Anderson, Jr. et al. |
| 2012/0244813 | A1 | 9/2012 | Liao et al. |
| 2013/0195308 | A1 | 8/2013 | Tankersley et al. |
| 2014/0078333 | A1 | 3/2014 | Miao |
| 2014/0133670 | A1 | 5/2014 | Lee et al. |
| 2014/0272915 | A1 | 9/2014 | Higashino et al. |
| 2014/0364208 | A1 | 12/2014 | Perry |
| 2014/0364209 | A1 | 12/2014 | Perry |
| 2015/0103606 | A1 | 4/2015 | Seong |
| 2016/0018659 | A1 | 1/2016 | Miyagawa |
| 2016/0044981 | A1* | 2/2016 | Frank ..................... A42B 1/22 2/422 |
| 2016/0249124 | A1 | 8/2016 | Drinkwater et al. |
| 2016/0349519 | A1 | 12/2016 | Yang et al. |
| 2016/0366502 | A1* | 12/2016 | Morris ................. H04R 1/1066 |
| 2017/0052378 | A1 | 2/2017 | Yang et al. |
| 2017/0055061 | A1 | 2/2017 | Yang et al. |
| 2017/0055079 | A1 | 2/2017 | Yang et al. |
| 2017/0075121 | A1 | 3/2017 | Chen et al. |
| 2017/0090201 | A1 | 3/2017 | Guo |

FOREIGN PATENT DOCUMENTS

| | | | |
|---|---|---|---|
| CN | 2938154 | Y | 8/2007 |
| CN | 101336008 | A | 12/2008 |
| CN | 201336696 | Y | 10/2009 |
| CN | 102387442 | A | 3/2012 |
| CN | 202455514 | U | 9/2012 |
| CN | 102918443 | A | 2/2013 |
| CN | 103149690 | A | 6/2013 |
| CN | 103581779 | A | 2/2014 |
| CN | 103596099 | A | 2/2014 |
| CN | 103702257 | A | 4/2014 |
| CN | 203747962 | U | 7/2014 |
| CN | 104166239 | A | 11/2014 |
| CN | 104254037 | A | 12/2014 |
| CN | 204180248 | U | 2/2015 |
| CN | 204229050 | U | 3/2015 |
| CN | 104503083 | A | 4/2015 |
| CN | 104503086 | A | 4/2015 |
| CN | 104503584 | A | 4/2015 |
| CN | 104503585 | A | 4/2015 |
| CN | 204302573 | U | 4/2015 |
| CN | 104635340 | A | 5/2015 |
| CN | 104765149 | A | 7/2015 |
| CN | 104793338 | A | 7/2015 |
| CN | 204575970 | U | 8/2015 |
| CN | 204666953 | U | 9/2015 |
| JP | 2007243631 | A | 9/2007 |
| JP | 2010145859 | A | 7/2010 |
| WO | WO2007119351 | A1 | 10/2007 |

OTHER PUBLICATIONS

Chen, Notice of Allowance, U.S. Appl. No. 15/059,111, dated Sep. 7, 2017, 7 pgs.
Guo, Office Action, U.S. Appl. No. 15/059,119, dated Aug. 24, 2017, 9 pgs.
International Search Report and Written Opinion, PCT/CN2015/080363, dated Feb. 3, 2016, 9 pgs.
International Search Report and Written Opinion, PCT/CN2015/087565, dated May 23, 2016, 9 pgs.
International Search Report and Written Opinion, PCT/CN2015/087566, dated Jan. 13, 2016, 9 pgs.
International Search Report and Written Opinion, PCT/CN2015/087564, dated May 10, 2016, 9 pgs.
International Search Report and Written Opinion, PCT/CN2015/087568, dated Jan. 13, 2016, 12 pgs.
International Search Report and Written Opinion, PCT/CN2015/089564, dated May 27, 2016, 7 pgs.
International Search Report and Written Opinion, PCT/CN2015/090860, dated Jul. 21, 2016, 11 pgs.
Yang, Office Action, U.S. Appl. No. 15/057,877, dated May 8, 2017, 11 pgs.
Yang, Office Action, U.S. Appl. No. 15/058,913, dated May 8, 2017, 13 pgs.

* cited by examiner

HEAD-MOUNTED ELECTRONIC DEVICE

RELATED APPLICATION

This application is a continuation application of PCT Patent Application No. PCT/CN2015/087568, entitled "HEAD-MOUNTED DISPLAY DEVICE" filed on Aug. 19, 2015, which is incorporated by reference in its entirety.

TECHNICAL FIELD

The present disclosure relates to head-mounted electronic devices, and more particularly relates to a head-mounted electronic device having a headphone and a display portion capable of rotating relative to each other.

BACKGROUND

As a near-eye display device, the head-mounted electronic device generates images and projects the images to eyes of a user, which enables the user to watch amplified virtual images, thus a greater display effect can be obtained accordingly. Currently, as for most of head-mounted electronic devices, audio is transmitted to the user by an earphone coupled thereto. However, a common sound effect may be obtained by the earphone. Thus, to overcome this disadvantage, some products are provided with audio interfaces, which allow users to freely equip headphones having a desired sound effect. However, it is troublesome to equip the headphone, and is inconvenient to carry around due to separation of the headphone from the product.

SUMMARY

Embodiments of the present application provide a head-mounted electronic device having a headphone and a display portion, which are capable of rotating relative to each other.

The head-mounted electronic device includes a headphone and a display portion. The headphone includes a C-shaped elastic belt which has two connection ends; two movable members, each rotatably connected to one of the connection ends respectively around a first axis; and two sound generators, each rotatably connected to one of the movable members respectively around a second axis. The display portion includes a main body, for generating and projecting images; and two connection members, which are connected to two opposite ends of the main body. The two connection members are rotatably connected to the sound generators respectively around a third axis.

Because of the movable members in the present application, when rotating around the third axis, the headphone is driven by the display portion to rotate around the first axis and the second axis, which avoids distortion of the elastic belt and the connection members, and ensures the display portion can be folded together with the headphone.

BRIEF DESCRIPTION OF THE DRAWINGS

Various embodiments of the present application will be specifically illustrated in combination with the detailed embodiments and the following accompanying drawings. It should be understood that each component in the accompanying drawings is not representative of the actual size and scale, which is schematic just for clear illustration, and is not to be construed as a limitation of the present application.

DETAILED DESCRIPTION

For better understandable purposes, technical solutions, and advantages of the present application, the following will further illustrate the present application in combination with various embodiments and the accompanying drawings. It should be understood that the specific embodiments described herein are merely used to illustrate the present application, and are not a limitation of the present application. Moreover, the drawings do not represent the actual scale of each element of the present application, and are just schematic. It must be pointed out that the "connection" between two elements mentioned in the present application does not necessarily refer to direct connection between two elements, and can be indirect connection between the two elements which is realized by a third element.

Figure 1:
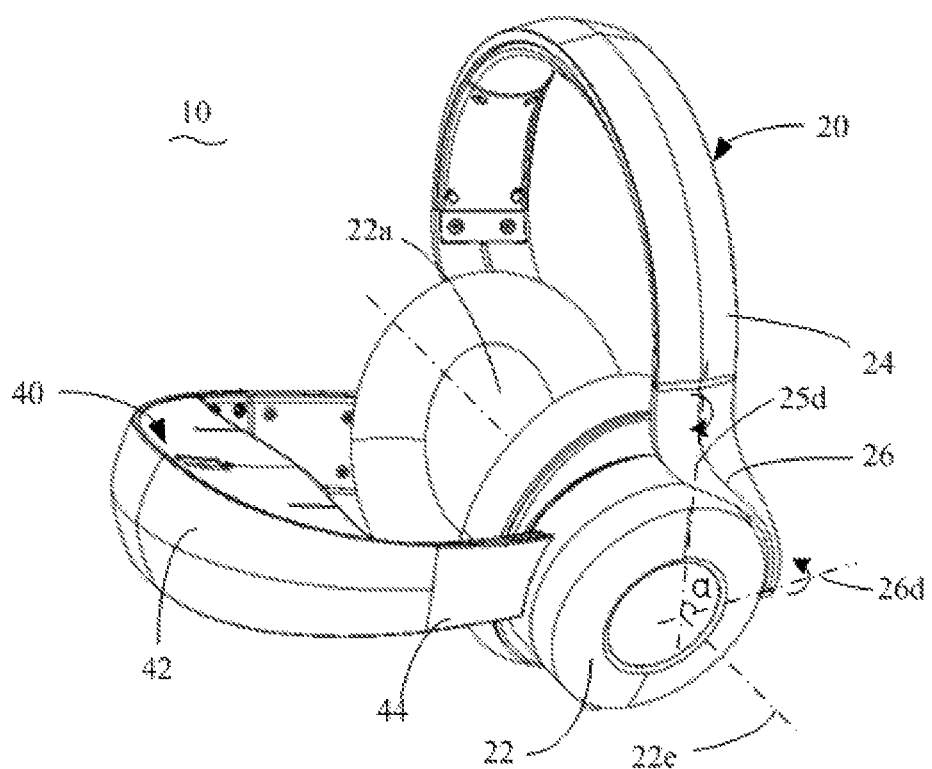
FIG. 1 is a schematic, perspective view of a head-mounted electronic device in accordance with an exemplary embodiment of the present application, wherein a headphone and a display portion are in a unfolded state.
Figure 7:
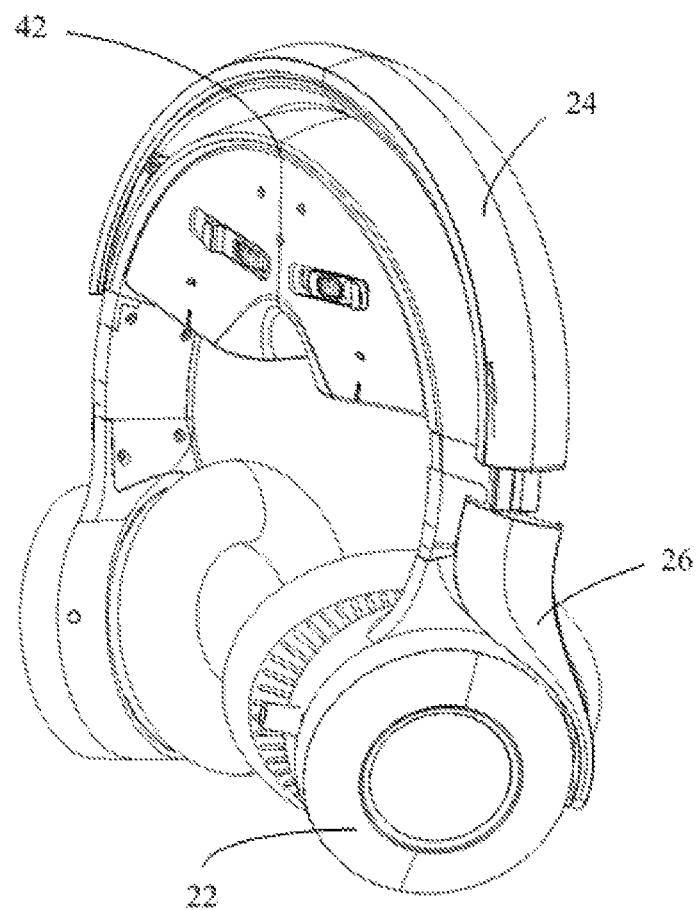
FIG. 7 is a perspective view of the head-mounted electronic device in FIG. 1, wherein the headphone and the display portion are in a folded state.

FIG. 1 is a perspective view of a head-mounted electronic device 10 in a first embodiment of the present application. The head-mounted electronic device 10 may be a head-mounted video player, a head-mounted game device, a head-mounted navigator, or the like. The head-mounted electronic device 10 includes a headphone 20 and a display portion 40. The display portion 40 can be rotatably connected to the headphone 20. By doing so, referring to FIG. 1, in an operation state, the display portion 40 can be rotated to angle with the headphone 20 in 90 degrees. At this point, after a user wears the headphone 20, the display portion 40 is located in the front of user's eyes and projects images into the user's eyes. Referring to FIG. 7, when in an idle state, the display portion 40 can be folded together with the headphone 20 to store the headphone 20.

Figure 2:
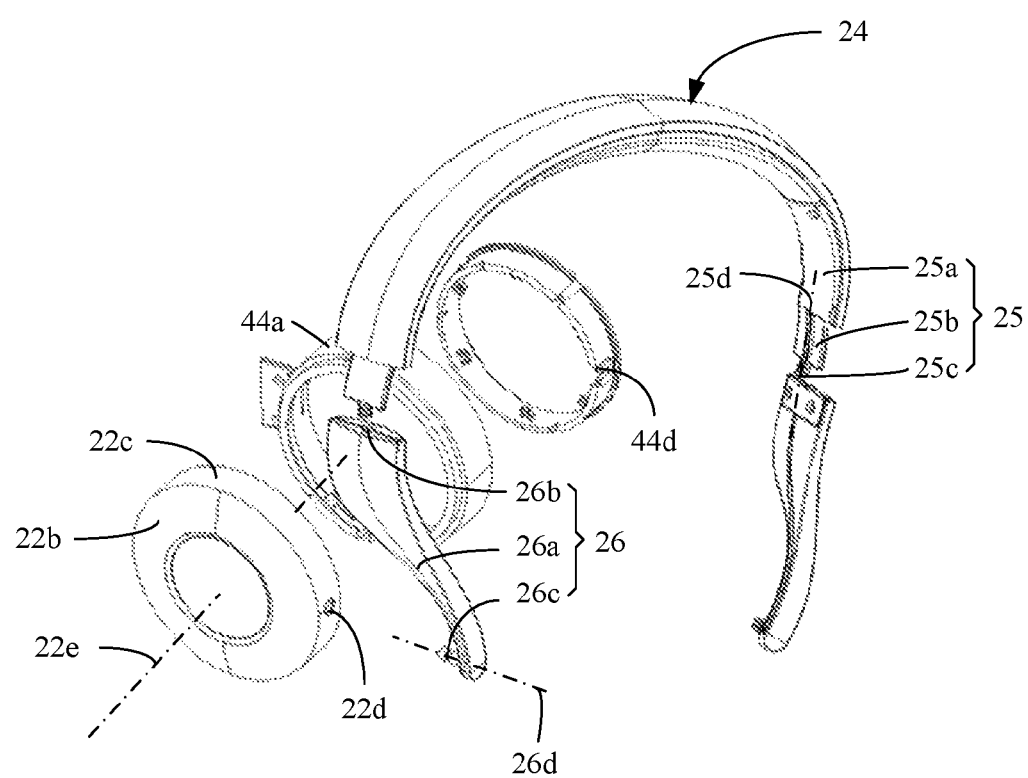
FIG. 2 is a partially exploded view of the head-mounted electronic device shown in FIG. 1.

Specifically, referring to FIGS. 1-2, the headphone 20 includes two sound generators 22, a C-shaped elastic belt 24, two movable members 26 for movably connecting the two sound generators 22 to the elastic belt 24, and two position limiting structures 28. The elastic belt 24 is substantially C-shaped, and has two connection ends 25 at the two openings. The elasticity of the elastic belt 24 allows the two connection ends 25 to be close to each other or to be away from each other. In the embodiment, each connection end 25 includes a sleeve portion 25a and a first sliding member 25b slidably received in the sleeve portion 25a. A first protruding post 25c protrudes from a side of the first sliding member 25b away from the sleeve portion 25a. A portion of the first sliding member 25b is capable of sliding out of the sleeve portion 25a. The first protruding post 25c defines a first axis 25d. The configuration of the first sliding member 25b allows the user to adjust the distance between the elastic belt 24 and the sound generators 22. It should be understood that, the first sliding member 25b is optional when the elastic belt 24 can be elongated or there is no need to adjust the distance between the elastic belt 24 and the sound generators 22.

Figure 3:
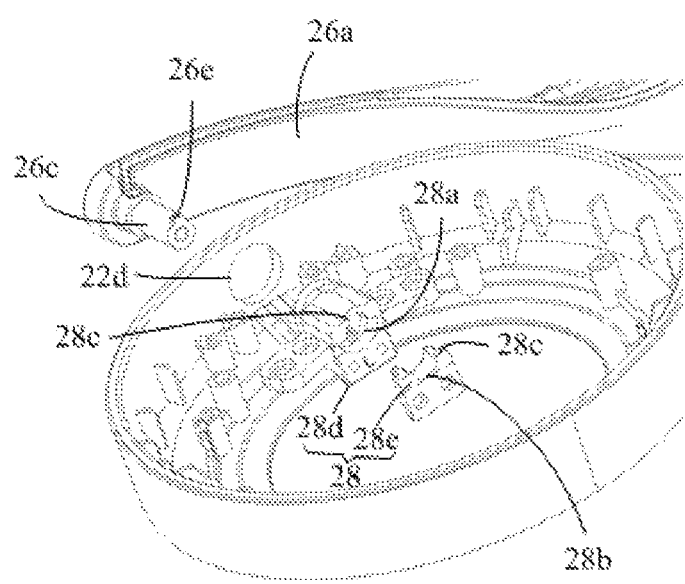
FIG. 3 is an exploded view of a position limiting structure of the head-mounted electronic device of FIG. 1.
Figure 4:
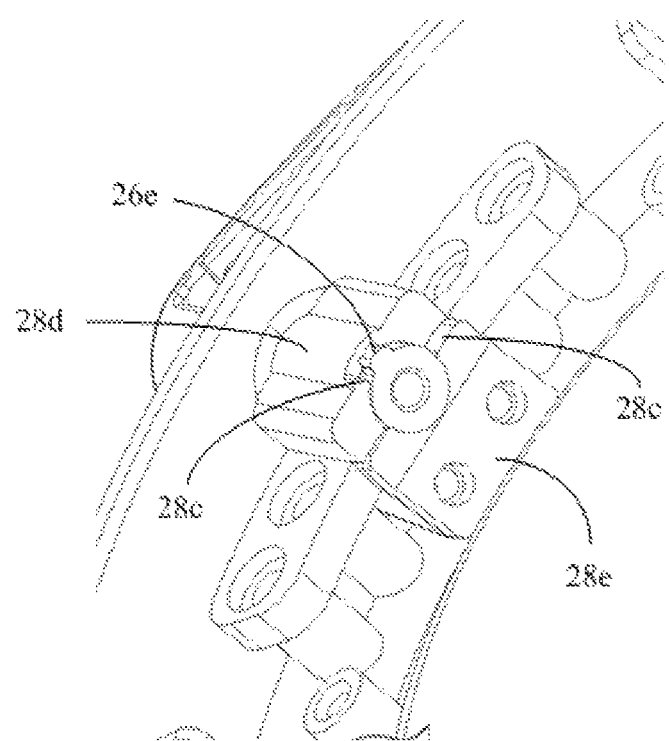
FIG. 4 is an assembled view of the position limiting structure and a movable member of the head-mounted electronic device shown in FIG. 1.

Each movable member 26 is rotatably connected to the corresponding connection end 25 around the first axis 25d, which enables the movable member 26 to rotatable around the first axis 25d relative to the connection end 25. In the embodiment, the movable member 26 is substantially arc-shaped, and includes an arc-shaped base body 26a, a first recess portion 26b recessing from an end of the base body 26a adjacent to the connection end 25, and a second protruding post 26c extending from the other end of the base body 26a in a direction toward the sound generator 22. Referring also to FIGS. 3-4, a bump 26e protrudes outwardly from a sidewall of the second protruding post 26c. The position limiting structures 28 are fixed to the sound generators 22 and coupled to the movable members 26, to limit the rotating range of the movable member 26 around the second axis 26d relative to the sound generator 22. Specifically, each position limiting structure 28 defines a receiving hole 28a which engages the second protruding post 26c, an arc-shaped surface 28b abutting the second protruding post 26e, and two blocking surfaces 28c arranged at opposite ends of the arc-shaped surface 28b and abutting the bump 26e. The receiving hole 28a limits the second protruding post 26c to swing. The arc of the arc-shaped surface 28b between the blocking surfaces 28c defines the rotation range of the second protruding post 26c. In the embodiment, the second protruding post 26c is made of metal. The position limiting structure 28 includes a first portion 28d, which is made of metal and defines the receiving hole 28a, and a second portion 28e, which is made of rubber and defines the arc-shaped surface 28b. The arc-shaped surface 28b tightly engages the second protruding post 26c. The second portion 28e made of rubber is coupled to the first portion 28d. The configuration of the second portion 28e enhances the rotation resistance of the second protruding post 26c, to avoid the second protruding post 26 from swinging easily. The first protruding post 25c is inserted into the first recess portion 26b and restricted by the position limiting structure 28, which may enable the first protruding post 25c to rotate in the first recess portion 26b.

Each sound generator 22 is rotatably connected to the corresponding movable member 26 around a second axis 26d, which enables the sound generator 22 to rotate around the second axis 26d on the movable member 26. In the embodiment, each sound generator 22 includes an inner wall 22a through which the voice propagates, an outer wall 22b opposite to the inner wall 22a, and a sidewall 22c extending from an edge of the outer wall 22b to the inner wall 22a. The outer wall 22b and the sidewall 22c form a chamber (not shown). The loudspeaker (not shown) of the sound generator 22 is housed in the chamber with a side thereof through which the voice propagates facing the inner wall 22a. The sidewall 22c defines a second through hole 22d. The second protruding post 26c is inserted into the second through hole 22d, and further latched inside the chamber, which enables the sound generator 22 to rotate around the second protruding post 26c. In other words, the second protruding post 26c defines the second axis 26d. An angle α is defined between the first axis 25d and the second axis 26d. Therefore, the sound generator 22 and the movable members 26 are rotatable around the first axis 25d, and the sound generator 22 is also rotatable around the second axis 26d, thereby enabling the movable member 26 to rotate in multiple dimensions. It is noted that, configurations of the mentioned protruding posts 25c, 26c and first recess portions 26b and second through holes 22d can be reversed, for example, the movable member includes the first protruding post 25c, while the first recess portion 26b is defined on the connection end 25.

The display portion 40 includes a main body 42 and two connection members 44. The main body 42 is used for generating and projecting images. Specifically, the main body 42 includes image generating devices and optical modules (not shown). Images generated by the image generating device pass through the optical module and is projected by the optical module toward a predefined direction. An adjustment structure (not shown) is arranged in the main body 42. The adjustment structure is used for adjusting a distance between the image generating device and the optical module, so as to fit in with different eyesight of users. The adjustment structure is also used to adjust the distance between two groups of the image generating devices and/or the optical modules, to fit in with different pupillometers.

The two connection members 44 are connected to opposite ends of the main body 42 respectively, each connection member 44 is rotatably connected to a corresponding sound generator 22 around a third axis 22e. The third axis 22e extends from the outer wall 22b toward the inner wall 22a. Therefore, the display portion 40 is capable of rotating to a position separating from the headphone 20, shown in FIG. 1, and a position where the display portion 40 approximately overlaps with the headphone 20, shown in FIG. 7. In the embodiment, the sidewall 22c of the sound generator 22 is a cylindrical wall. An annular 44a is arranged at an end of the connecting member 44 adjacent to the sound generator 22. The annular 44a also has a cylindrical wall. The annular 44a engages the sidewall 22c of the sound generator 22 by a latching member 44b, which enables the annular 44a to rotate around the axis of the sidewall 22c. Therefore, the sidewall 22c of the sound generator 22 defines the third axis 22e. At this time, the third axis 22e is substantially perpendicular to the first axis 25d and/or the second axis 26d.

When the head-mounted electronic device 10 is assembled and in an operation state, referring to FIG. 1, the display portion 40 can be rotated to a position angling with the headphone 20 in 90 degrees, without external force. It should be noted that the recited 90 degrees is merely for illustration, various habits of users may result in different angles, for example, 70 degrees, 80 degrees, or 100 degrees. At this time, referring to FIG. 5, ends of the sound generators 22 away from the elastic belt 24 slants toward each other, thus, a second angle β is formed between different third axes 22e of the sound generator 22. The configuration of the second angle β makes the sound generator 22 to be further fit in with users' ears.

Figure 5:
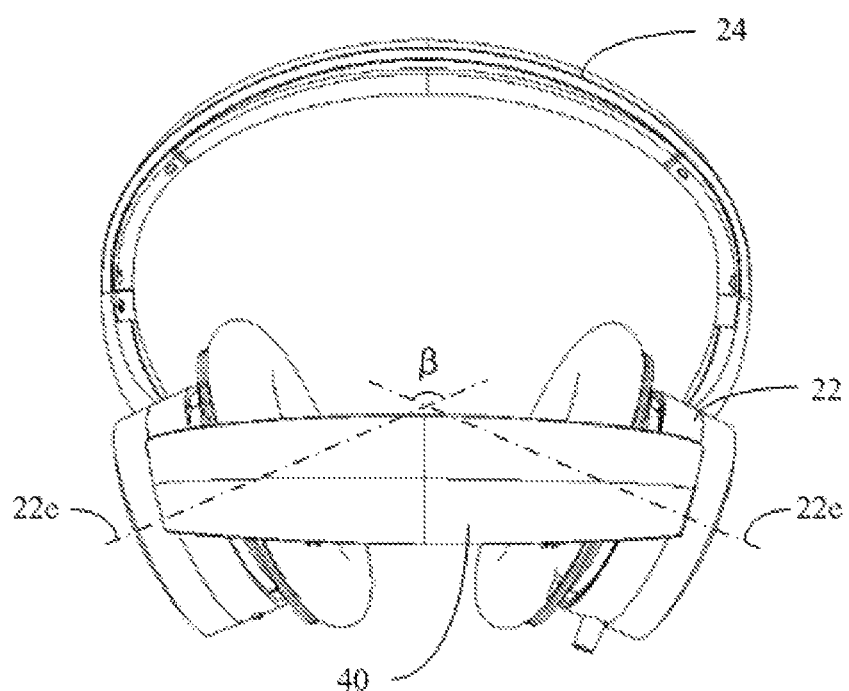
FIG. 5 is a front view of the head-mounted electronic device in FIG. 1.

Referring to FIG. 1 and FIG. 5, when the display portion 40 is folded together with the headphone 20, the display portion 40 is rotated in an upward direction shown in FIG. 5. Because the third axis 22e is slant relative to a horizontal direction shown in FIG. 5, and the main body 42 cannot be elongated, thus, when the display portion 40 is rotated upwardly, the right sound generator 22 in FIGS. 1 and 5 is driven to rotate around the second axis 26d anticlockwise (see the arrow signed on the second axis 26d in FIG. 1). In other words, a side of the right sound generator 22 adjacent to the first recess portion 26b rotates in a direction adjacent to the other sound generator 22, and the other sound generator 22 rotates in a reverse direction. At the same time, the upward rotation of the display portion 40 also drives the right sound generator 22 and the right movable member 26 in FIGS. 1 and 5 to rotate around the first axis 25d in an arrow direction marked thereon. In other words, a side of the right sound generator 22 adjacent to the second protruding post 26c rotates in a direction away from to the other sound generator 22.

Based on the above description, in the embodiment, because of the configuration of the second angle β, the sound generator 22 is well fit with users' two ears, which results in a better audio effect. However, at this point, the third axis 22e is not horizontally disposed, namely, the two third axes 22e are not aligned with each other but angled with each other, thus the process of the display portion 40 rotating relative to the headphone 20 becomes more complex. In this situation, the elastic belt 24 is fixed to the sound generator 22 directly, that is, the movable member 26 is optional. Thus the elastic belt 24 and the connection member 44 will deform during the display portion 40 rotating relative to the sound generator 22. However, in the embodiment, after the movable member 26 is arranged to the headphone 20, the sound generator 22 is rotatable in two dimensions, to allow the sound generator 22 to be driven by the display portion 40 to rotate around the first axis 25d and the second axis 26d, thereby protecting the elastic belt 24 and the connection member 44 from distortion. Furthermore, the configuration of the position limiting structures 28 allows the movable members 26 to rotate, and also limits the rotation angle range of the movable members 26, which prevents the movable member 26 from moving to a position where a friction between the movable members 26 and the sidewall 22c or the annular 44a is generated, whereby frictions between these elements are avoided.

In above embodiment, the base body 26a of the movable member 26 extends for a quarter of a circle, that is, the first angle α is substantially 90 degrees. However, it should be understood that, when with other angles, the sound generator 22 can also rotates in two-dimensional to achieve the above purpose. Therefore, the first angle α is not limited to 90 degrees. Preferably, the first angle α is greater than 30 degrees but is less than 150 degrees, or is greater than 210 degrees but is less than 330 degrees. At this time, the length of the main body 26a is changed accordingly.

In the above embodiment, the second angle β is substantially 150 degrees when no external force is applied to the head-mounted electronic device 10. However, it should be understood that for different persons, the second angle β may change, on condition that the head-mounted electronic device 10 can be well fit in with user's ears. Preferably, the second angle β is greater than 100 degrees but is less than 170 degrees.

Figure 6:
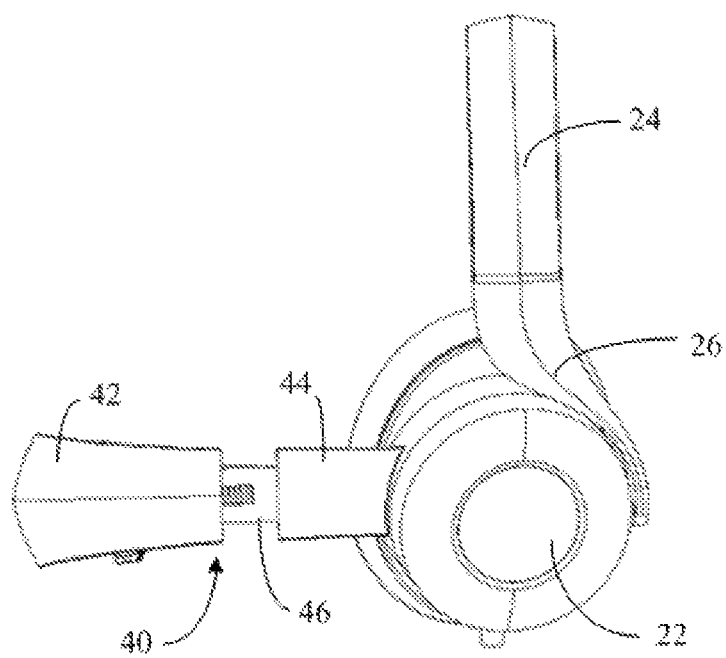
FIG. 6 is a side view of the head-mounted electronic device in FIG. 1.

Preferably, the movable member 44 is in a parallel-movable connection with the main body 42 or the sound generator 22, thus the movable member 44 is movable to a first position adjacent to the main body 42 or the sound generator 22 and a second position away from the main body 42 or the sound generator 22. As a result, the distance between the main body 42 and users' eyes can be adjusted. Specifically, referring to FIG. 6, taking the movable member 44 being movably connected to the main body 42 as an example, the display portion 40 further includes two support members 46 extending outwardly from two opposite ends of the main body 42, and the connection member 44 slidably engages the support members 46, thereby enabling the main body 42 to be closed to or away from the sound generator 22. The manner of the connection member 44 being movably connected to the sound generator 22 is similar to that of the connection member 44 being movable connected to the main body 42, which will not be repeated herein.

In the description of the present application, the "first", "second" are merely used for description, and cannot be understood to indicate or imply relative importance or implicitly indicate the number of the indicated technical features. Therefore, features with a limitation of "first" or "second" can explicitly or implicitly include one or more feature. In the description of the present application, "multiple" means two or more than two, unless there is specific limitation.

In the description of the present application, unless explicitly stated and limited, "mounted", "connected", and "connection" should be construed broadly. For example, connection may be a fixed connection, can also be a detachable connection, can be an integral connection; can be a direct connection, can be an indirect connection realized by an intermediate medium, or can be an internal communication or an interaction between two elements. Those skilled in the art can understand the specific meanings of the above terms in the present application according to specific conditions.

The foregoing description is only the preferred embodiments of the present application, but is not intended to limit the scope of the invention. Accordingly, any modification, alternatives, improvements or the like within the spirit and principles of the present application should be included in the scope of the present application.

What is claimed is:

1. A head-mounted electronic device, comprising a headphone, a display portion, and two position limiting structures;

wherein the headphone comprises a C-shaped elastic belt, two movable members, and two sound generators; wherein the elastic belt has two connection ends; each of the two movable members is rotatably connected to one of the two connection ends respectively around a first axis that extends along the elastic belt from the respective one of the two connection ends; each of the two sound generators is rotatably connected to one of the two movable members respectively around a second axis that is coplanar with a periphery and a body of the respective sound generator; a first angle is defined between the second axis and the first axis;

wherein the display portion comprises a main body and two connection members; wherein the main body generates and projects images, the connection members are connected to opposite ends of the main body respectively and are rotatably connected to the sound generators respectively around a respective third axis; a second angle is defined between the two third axes; and wherein each of the position limiting structures is fixed to one of the sound generators and coupled to one of the movable members, to limit a rotating angle of the movable member around the second axis relative to the sound generator.

2. The head-mounted electronic device as described in claim 1, wherein each movable member comprises a protruding post extending into the sound generator, a bump is arranged at a sidewall of the protruding post; the position limiting structure comprises an arc-shaped surface abutting the protruding post and two blocking surfaces arranged at opposite ends of the arc-shaped surface for limiting a rotation range of the bump around the second axis.

3. The head-mounted electronic device as described in claim 2, wherein the position limiting structure further defines a receiving hole hosting the protruding post.

4. The head-mounted electronic device as described in claim 3, wherein the position limiting structure comprises a first portion defining the receiving hole, and a second portion mounted to the first portion, the second portion is made of rubber and defines the arc-shaped surface, the arc-shaped surface tightly engages the protruding post.

5. The head-mounted electronic device as described in claim 1, wherein each sound generator comprises an inner wall through which the voice propagates and an outer wall opposite to the inner wall, a corresponding third axis perpendicularly extending from the outer wall toward the inner wall.

6. The head-mounted electronic device as described in claim 5, wherein each of the movable members comprises a first end and a second end, the first end is rotatably connected to the corresponding connection end around the first axis, the second end is rotatably connected to a corresponding sound generator around the second axis, a curved portion is formed between the first end and the second end.

7. The head-mounted electronic device as described in claim 6, wherein each sound generator further comprises a side wall extending from an edge of the outer wall toward the inner wall, the movable member is rotatably connected to the side wall around the second axis.

8. The head-mounted electronic device as described in claim 6, wherein each connection end comprises one of a group of a first protruding post and a first recess portion, the first end of each movable member comprises the other one of the group of a first protruding post and a first recess portion, the first protruding post is rotatably latched onto the first recess portion, and the first protruding post and the first recess portion define the first axis.

9. The head-mounted electronic device as described in claim 6, wherein each sound generator comprises one of a group of a second protruding post and a second recess portion, the second end of each movable member comprises the other one of the group of a second protruding post and a second recess portion, the second protruding post is rotatably latched onto the second recess portion, and the second protruding post and the second recess portion defines the second axis.

10. The head-mounted electronic device as described in claim 7, wherein the side wall of each sound generator is a cylindrical wall, a central axis of the cylindrical wall is the third axis, and the connection member is rotatably connected to the sidewall around the third axis.

11. The head-mounted electronic device as described in claim 10, wherein an end of each connection member adjacent to the corresponding sound generator comprises a second cylindrical surface, the second cylindrical surface is rotatably connected to the side wall of the sound generator around the third axis.

12. The head-mounted electronic device as described in claim 5, wherein the third axis of each sound generator is substantially perpendicular to the first axis and the second axis.

13. The head-mounted electronic device as described in claim 5, wherein the second angle is between 100 degrees and 170 degrees.

14. The head-mounted electronic device as described in claim 5, wherein the first angle is between 30 degrees and 150 degrees.

15. The head-mounted electronic device as described in claim 1, wherein each movable member is movably connected to the main body or the sound generator, and the movable member is movable to a first position adjacent to the main body or the sound generator, and to a second position away from the main body or the sound generator.

16. The head-mounted electronic device as described in claim 1, wherein each movable member is movably connected to the connection end, and the movable member is movable to a first position adjacent to the elastic belt and a second position away from the elastic belt.

17. The head-mounted electronic device as described in claim 1, wherein the display portion is folded inside the headphone when the connection member is rotated with respect to the third axis to align the main body with the elastic belt.

* * * * *